(12) United States Patent
Reytier et al.

(10) Patent No.: US 10,480,082 B2
(45) Date of Patent: Nov. 19, 2019

(54) HIGH-TEMPERATURE, LOW-TEMPERATURE—GRADIENT METHODS FOR (CO-)ELECTROLYSIS OF WATER (SOEC) OR FOR PRODUCING ELECTRICITY WITHIN A REACTOR OR FUEL-CELL STACK (SOFC) RESPECTIVELY

(71) Applicant: COMMISSARIAT A L'ENERGIE ATOMIQUE ET AUX ENERGIES ALTERNATIVES, Paris (FR)

(72) Inventors: Magali Reytier, Villard de Lans (FR); Nicolas Bardi, Miribel-les-Echelles (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 117 days.

(21) Appl. No.: 15/751,319

(22) PCT Filed: Aug. 12, 2016

(86) PCT No.: PCT/EP2016/069281
§ 371 (c)(1),
(2) Date: Feb. 8, 2018

(87) PCT Pub. No.: WO2017/025636
PCT Pub. Date: Feb. 16, 2017

(65) Prior Publication Data
US 2018/0237924 A1    Aug. 23, 2018

(30) Foreign Application Priority Data
Aug. 12, 2015    (FR) .................................... 15 57685

(51) Int. Cl.
C25B 1/08    (2006.01)
C25B 1/10    (2006.01)
(Continued)

(52) U.S. Cl.
CPC .................. *C25B 1/08* (2013.01); *C25B 1/00* (2013.01); *C25B 1/10* (2013.01); *C25B 9/04* (2013.01);
(Continued)

(58) Field of Classification Search
None
See application file for complete search history.

(56) References Cited

U.S. PATENT DOCUMENTS 6,855,451 B2    2/2005 Ghosh et al.
2003/0235725 A1  12/2003 Haltiner, Jr. et al.
(Continued)

FOREIGN PATENT DOCUMENTS

| CA | 2 913 864 A1 | 12/2014 |
|---|---|---|
| EP | 1 411 571 A2 | 4/2004 |
| FR | 3 016 084 A1 | 7/2015 |

OTHER PUBLICATIONS

International Search Report dated Sep. 30, 2016, in PCT/EP2016/089281 filed Aug. 12, 2016.
(Continued)

*Primary Examiner* — Nicholas A Smith
(74) *Attorney, Agent, or Firm* — Oblon, McClelland, Maier & Neustadt, L.L.P.

(57) ABSTRACT

The invention essentially consists in supplying fuel (either steam or a mixture of steam with CO2 or H2 or CH4) to distinct zones of a cell or a group of stacked cells and of an adjacent cell or group of adjacent stacked cells within a given (co-)electrolysis reactor or a SOFC fuel-cell stack.

21 Claims, 9 Drawing Sheets

Figure 1:
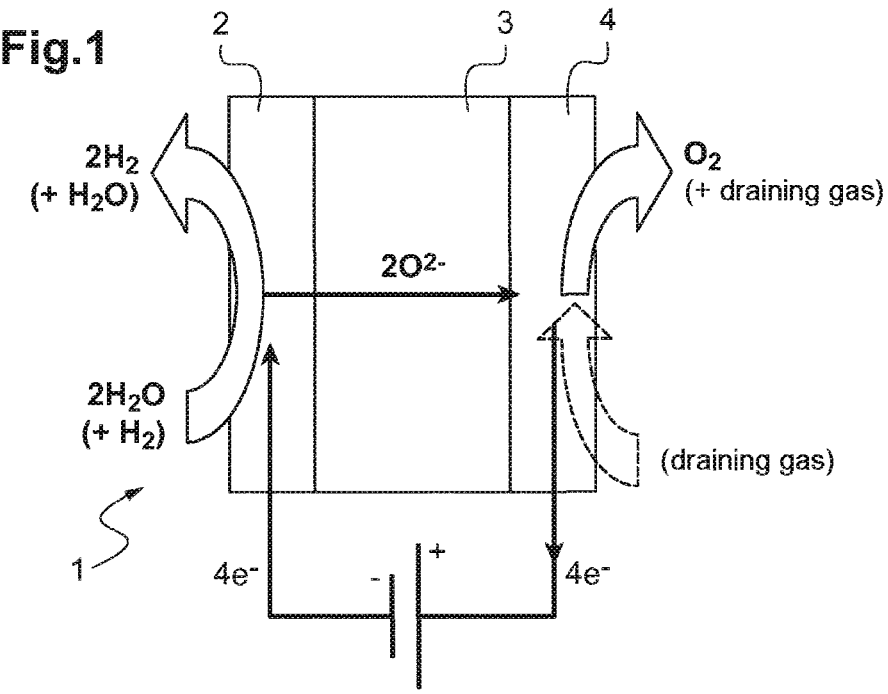

(51) Int. Cl.
  *C25B 9/18* (2006.01)
  *H01M 8/12* (2016.01)
  *H01M 8/249* (2016.01)
  *H01M 8/04298* (2016.01)
  *C25B 15/08* (2006.01)
  *C25B 1/00* (2006.01)
  *C25B 9/04* (2006.01)
  *C25B 9/20* (2006.01)
  *H01M 8/124* (2016.01)

(52) U.S. Cl.
  CPC ............ *C25B 9/18* (2013.01); *C25B 9/20* (2013.01); *C25B 15/08* (2013.01); *H01M 8/04298* (2013.01); *H01M 8/12* (2013.01); *H01M 8/249* (2013.01); *H01M 2008/1293* (2013.01); *Y02E 60/366* (2013.01); *Y02P 20/132* (2015.11)

(56) References Cited

U.S. PATENT DOCUMENTS

| | | |
|---|---|---|
| 2013/0130139 A1 | 5/2013 | Kah et al. |
| 2014/0093805 A1 | 4/2014 | Dong et al. |
| 2015/0333342 A1* | 11/2015 | Planque ............... H01M 8/2425 429/457 |
| 2016/0060776 A1* | 3/2016 | Kawajiri ................. C25B 15/08 205/637 |
| 2016/0111749 A1 | 4/2016 | Wang et al. |
| 2018/0202055 A1* | 7/2018 | Reytier ................... C25B 15/02 |

OTHER PUBLICATIONS

French Search Report dated May 20, 2016 in French Application 1557685 filed Aug. 12, 2015.

\* cited by examiner

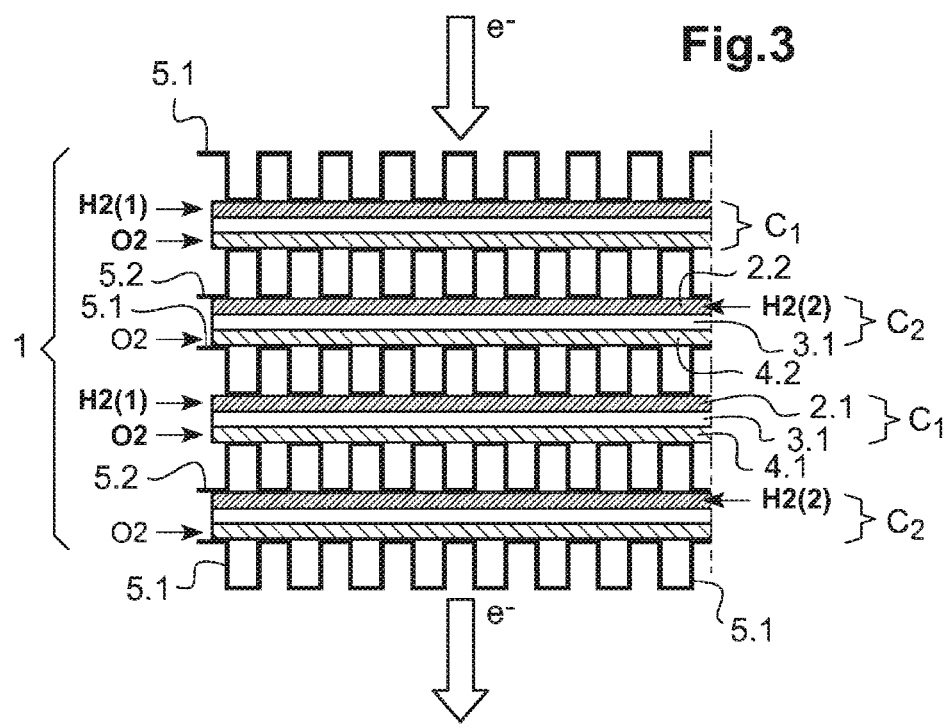
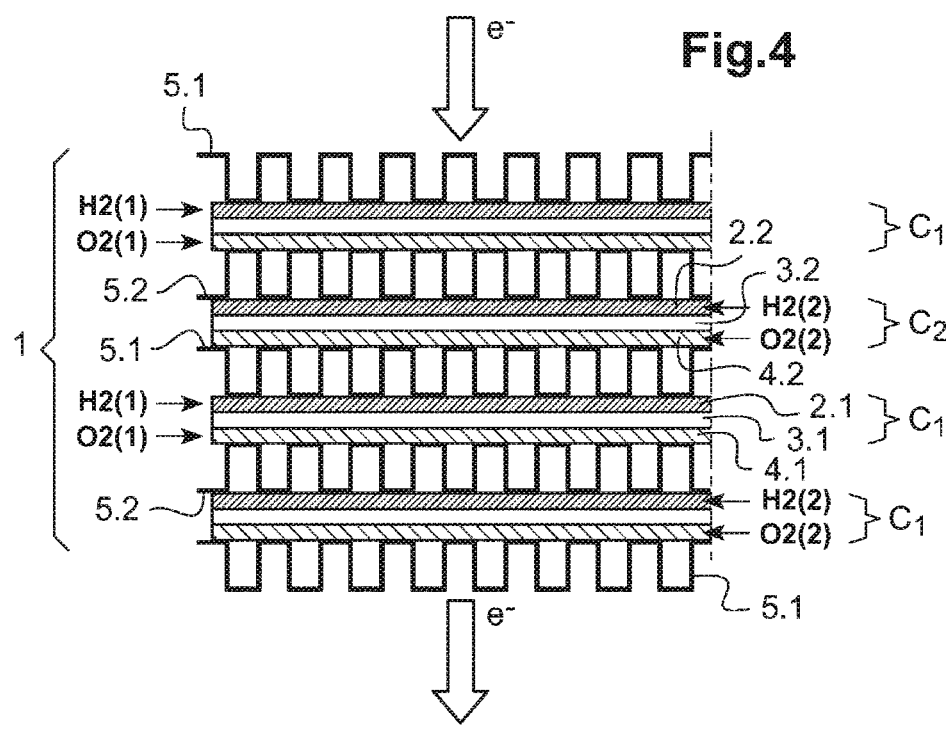

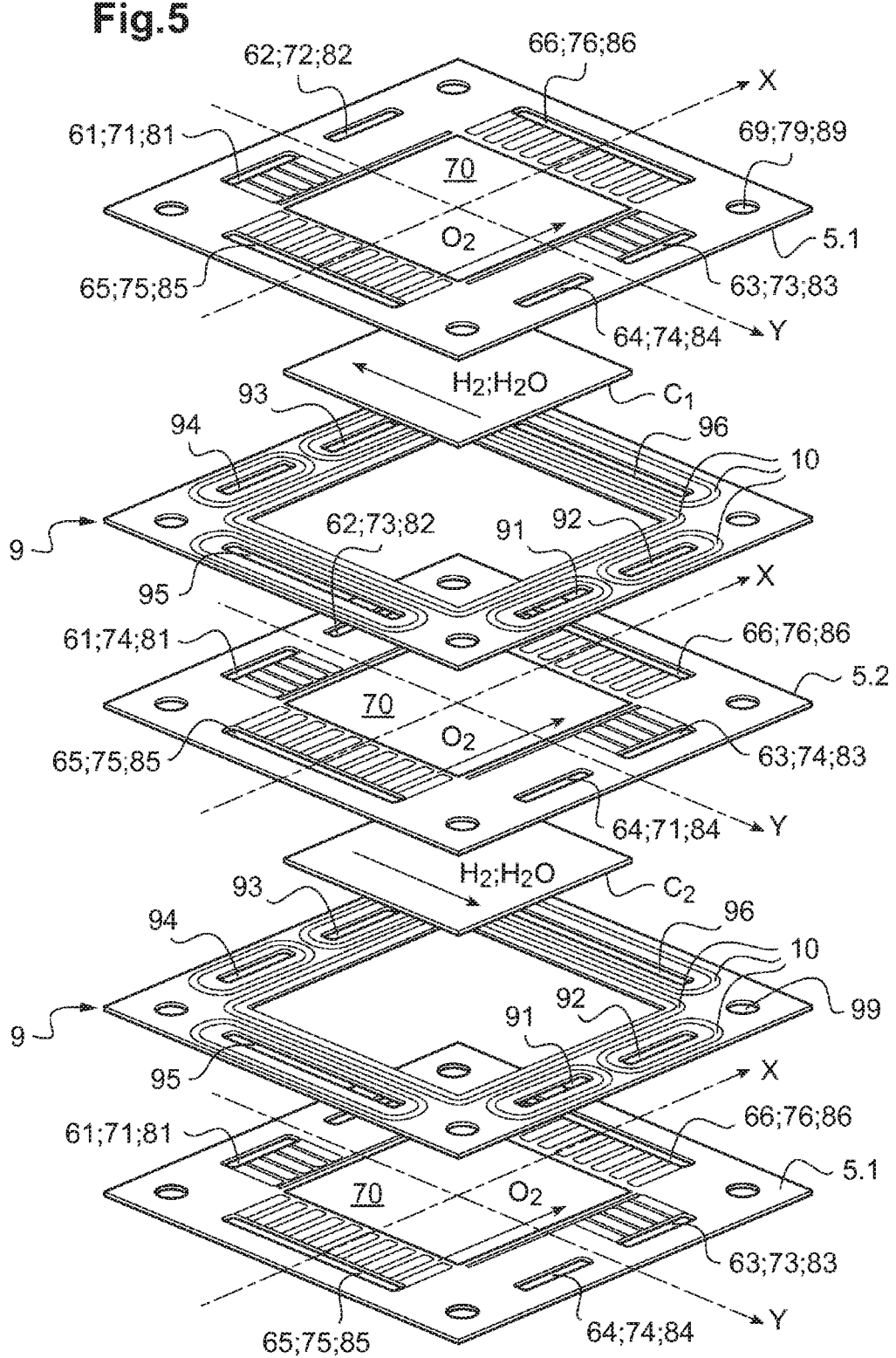

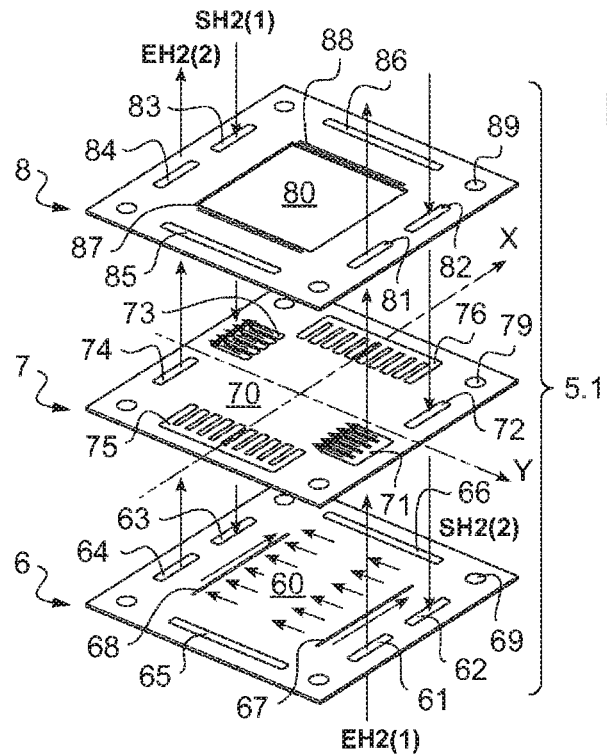
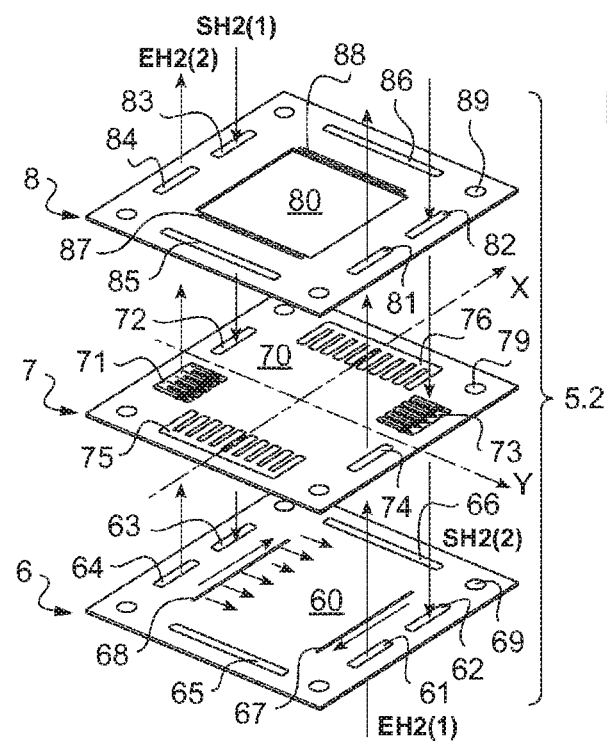

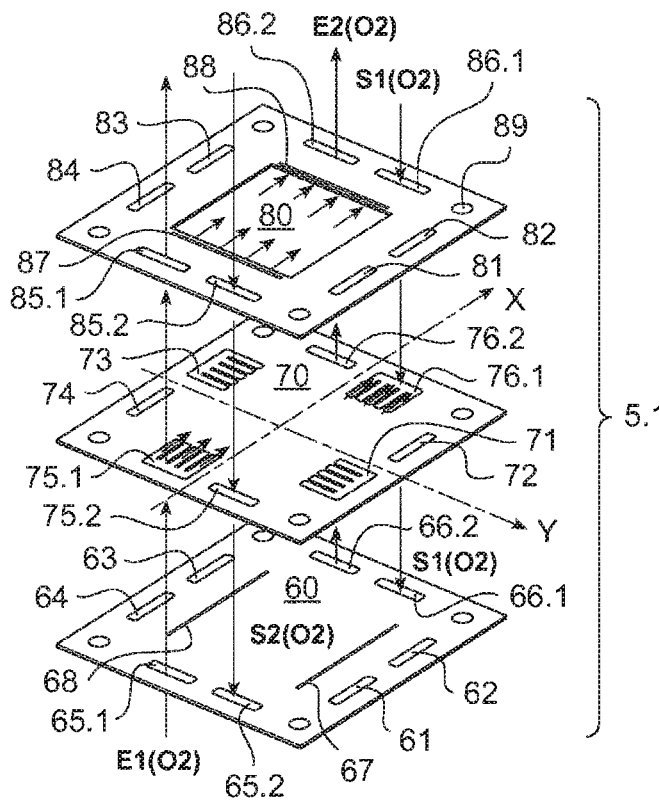
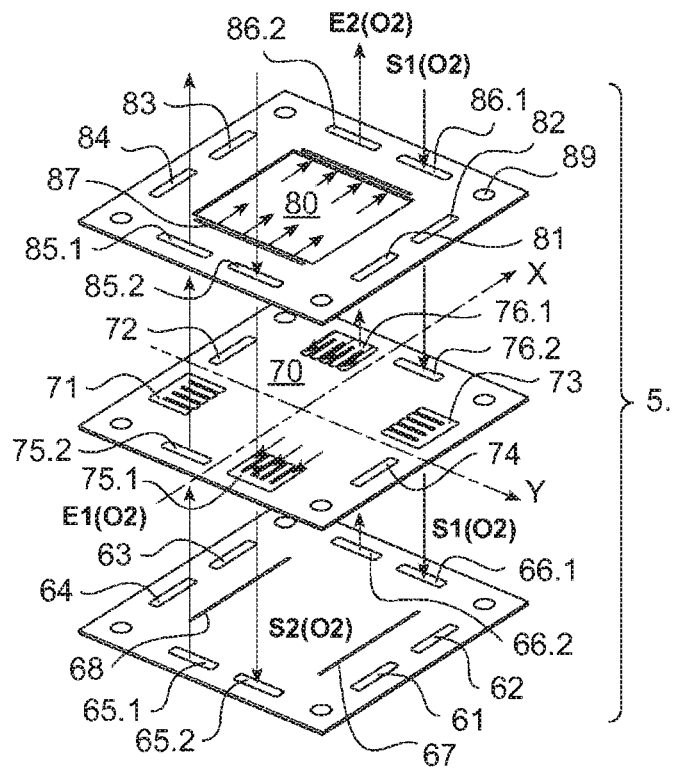

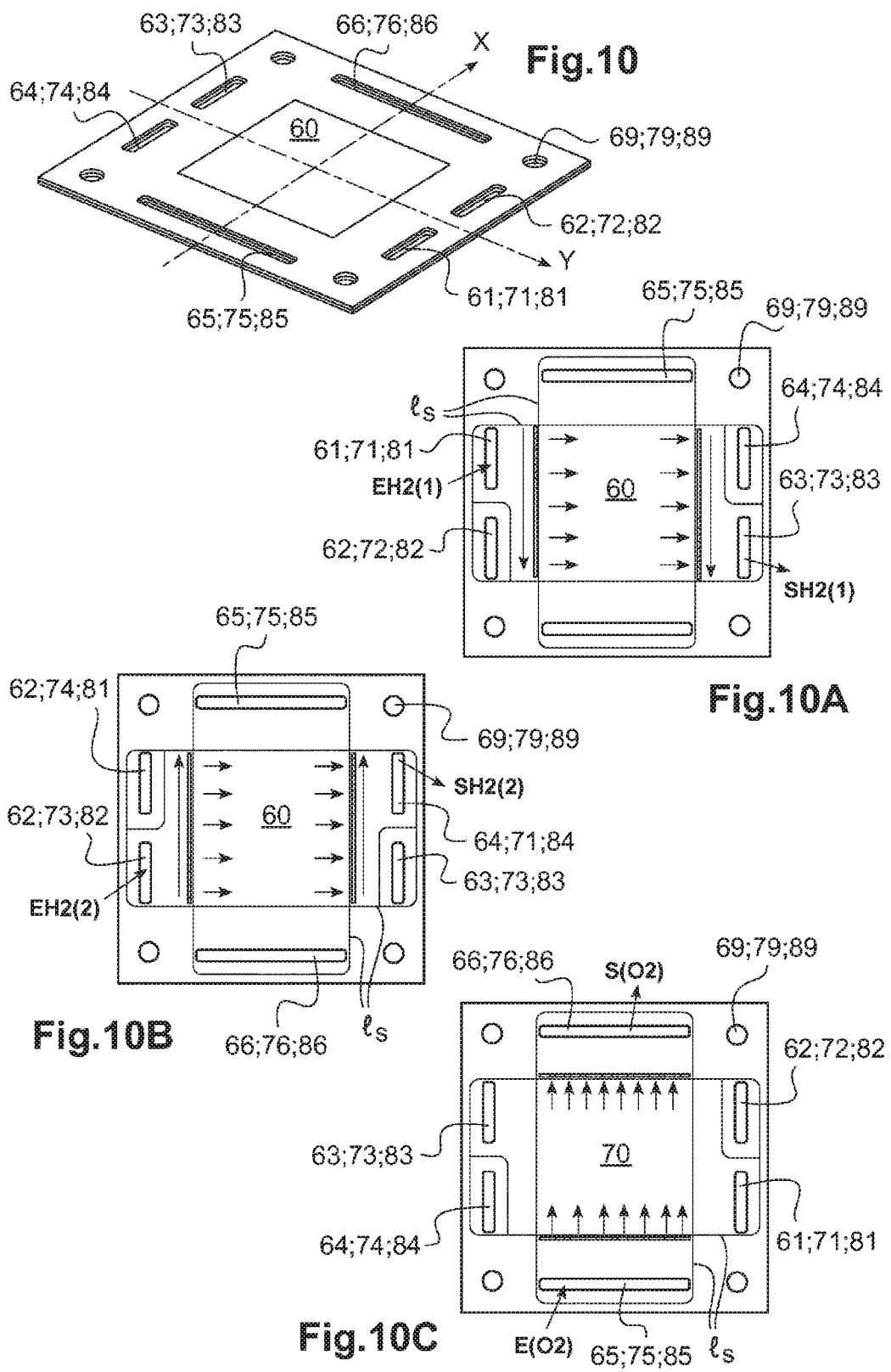

HIGH-TEMPERATURE, LOW-TEMPERATURE—GRADIENT METHODS FOR (CO-)ELECTROLYSIS OF WATER (SOEC) OR FOR PRODUCING ELECTRICITY WITHIN A REACTOR OR FUEL-CELL STACK (SOFC) RESPECTIVELY

TECHNICAL FIELD

The present invention relates to the field of solid oxide fuel cells (SOFC) and that of high-temperature electrolysis of water (HTE, or else HTSE, acronym for High Temperature Steam Electrolysis) also using solid oxides (SOEC, acronym for Solid Oxide Electrolysis Cell).

The invention more particularly relates to novel methods for operating a reactor for high-temperature electrolysis (HTE) of water of SOEC type to produce hydrogen $H_2$ from steam $H_2O$ or a reactor for the co-electrolysis of carbon dioxide $CO_2$ and water $H_2O$ to produce synthesis gas (mixture of CO and $H_2$), or an SOFC-type fuel cell, containing a stack of individual electrochemical cells containing solid oxides.

Although it is described mainly with reference to the application of high-temperature electrolysis of water, the invention applies equally well to the co-electrolysis of carbon dioxide $CO_2$ and water $H_2O$, or to an SOFC fuel cell supplied with $H_2$ or with methane $CH_4$ as fuel and with air or oxygen $O_2$ as oxidizer.

PRIOR ART

The electrolysis of water is an electrochemical reaction that decomposes water into gaseous dioxygen and dihydrogen by means of an electrical current according to the reaction:

$$H_2O \rightarrow H_2 + \tfrac{1}{2}O_2.$$

It is advantageous to catty out the electrolysis of water at high temperature, typically between 600 and 950° C., as some of the energy required for the reaction can be supplied by heat, which is less expensive than electricity, and carrying out the reaction is more efficient at high temperature and does not require a catalyst. For implementing high-temperature electrolysis, use of an electrolyzer of the SOEC type (acronym for "solid oxide electrolysis cell") is known, said electrolyzer consisting of a stack of individual units, each comprising a solid oxide electrolysis cell, consisting of three layers, anode/electrolyte/cathode, superposed on one another, and of interconnection plates made of metal alloys, also referred to as bipolar plates, or interconnectors. The function of the interconnectors is to provide both passage of the electrical current and circulation of the gases in the vicinity of each cell (injected steam, hydrogen and oxygen extracted in an HTE electrolyzer; air and hydrogen injected and water extracted in an SOFC cell) and to separate the anode and cathode compartments, which are the compartments for circulation of the gases on the anode side and the cathode side of the cells, respectively. For carrying out high-temperature electrolysis HTE of steam, steam $H_2O$ is injected into the cathode compartment. Under the action of the current applied to the cell, dissociation of the water molecules in the form of steam takes place at the interface between the hydrogen electrode (cathode) and the electrolyte: this dissociation produces dihydrogen gas $H_2$ and oxygen ions. The dihydrogen is collected and discharged at the outlet of the hydrogen compartment. The $O^{2-}$ oxygen ions migrate through the electrolyte and recombine into dioxygen at the interface between the electrolyte and the oxygen electrode (anode).

As shown schematically in FIG. 1, each individual electrolysis cell 1 is formed from a cathode 2 and an anode 4, placed on either side of a solid electrolyte 3. The two electrodes (cathode and anode) 2, 4 are conductors made of porous material, and the electrolyte 3 is gastight, an electron insulator and an ion conductor. The electrolyte may in particular be an anion conductor, more precisely an anion conductor of the $O^{2-}$ ions and the electrolyzer is then referred to as an anion electrolyzer.

The electrochemical reactions take place at the interface between each of the electron conductors and the ion conductor.

At the cathode 2, the half-reaction is as follows:

$$2H_2O + 4e^- \rightarrow 2H_2 + 2O^{2-}.$$

At the anode 4, the half-reaction is as follows:

$$2O^{2-} \rightarrow O_2 + 4e^-.$$

The electrolyte 3 inserted between the two electrodes 2, 4 is the site of migration of the $O^{2-}$ ions under the effect of the electrical field created by the difference in potential imposed between the anode 4 and the cathode 2.

As illustrated in brackets in FIG. 1, the steam at the cathode inlet may be accompanied by hydrogen $H_2$ and the hydrogen produced and recovered at the outlet may be accompanied by steam. Likewise, as illustrated in dotted lines, a draining gas such as air may additionally be injected at the inlet in order to remove the oxygen produced. The injection of a draining gas has the additional role of acting as thermal regulator.

An individual electrolysis reactor consists of an individual cell as described above, with a cathode 2, an electrolyte 3 and an anode 4, and of two monopolar connectors which provide the electrical, hydraulic and thermal distribution functions.

In order to increase the flow rates of hydrogen and oxygen produced, it is known to stack several individual electrolysis cells on top of one another, separating them with interconnection devices, usually known as bipolar interconnection plates or interconnectors. The assembly is positioned between two end interconnection plates which bear the electrical supplies and gas supplies of the electrolyzer (electrolysis reactor).

An electrolysis reactor or high-temperature water electrolyzer (HTE) thus comprises at least one, generally a plurality of, electrolysis cells stacked on top of one another, each individual cell being formed of an electrolyte, of a cathode and of an anode, the electrolyte being inserted between the anode and the cathode.

The fluidic and electrical interconnection devices, which are electron conductors, are in electrical contact with the electrodes and generally provide the functions of introducing and collecting electrical current and delimit one or more compartments for the circulation of the gases. More precisely, an interconnector provides electrical contact via one face thereof with the cathode of one cell, and via the other face thereof with the anode of the adjacent cell.

Thus, a "cathode" compartment has the role of distributing the electrical current and steam and also of recovering the hydrogen at the cathode in contact.

An "anode" compartment has the role of distributing the electrical current and also of recovering the oxygen produced at the anode in contact, optionally with the help of a draining gas.

Figure 2:
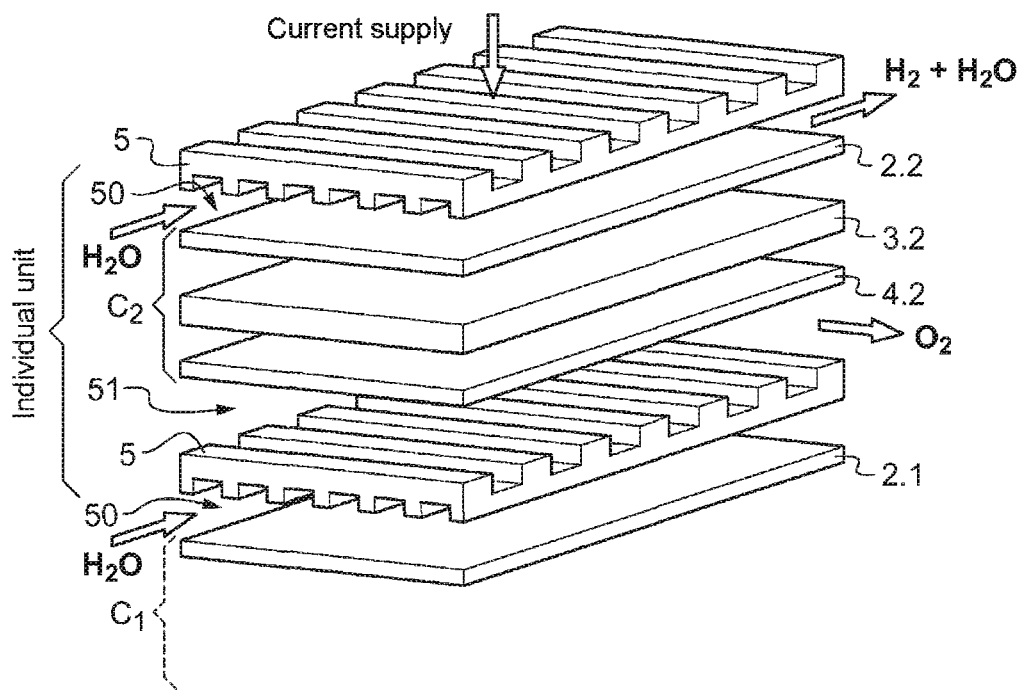

FIG. 2 represents an exploded view of individual units of a high-temperature steam electrolyzer according to the state of the art. This HTE electrolyzer comprises a plurality of individual electrolysis cells C1, C2, . . . , of solid oxide (SOEC) type, stacked alternately with interconnectors 5. Each cell C1, C2, . . . consists of a cathode 2.1, 2.2, . . . and an anode 4.1, 4.2, . . . between which an electrolyte 3.1, 3.2, . . . is arranged. The assembly of the electrolysis cells is generally supplied in series by the electrical current and in parallel, by the gases.

The interconnector 5 is a component made of metal alloy, which provides the separation between the cathode compartment 50 and anode compartment 51, which are defined by the volumes between the interconnector 5 and the adjacent cathode 2.1 and between the interconnector 5 and the adjacent anode 4.2, respectively. It also provides distribution of the gases to the cells. Injection of steam into each individual unit takes place in the cathode compartment 50. Collection of the hydrogen produced and of the residual steam at the cathode 2.1, 2.2, . . . takes place in the cathode compartment 50 downstream of the cell C1, C2, . . . after dissociation of the steam by the latter. Collection of the oxygen produced at the anode 4.2 takes place in the anode compartment 51 downstream of the cell C1, C2, . . . after dissociation of the steam by the latter.

The interconnector 5 provides the passage of the current between the cells C1 and C2 by direct contact with the adjacent electrodes, that is to say between the anode 4.2 and the cathode 2.1.

In a solid oxide fuel cell SOFC according to the state of the art, the cells C1 C2, . . . , and interconnectors 5 used are the same components, but the operation is the reverse of that of an HTE electrolyzer such as has just been explained, with a reversed current direction, with air which supplies the cathode compartments 51 and hydrogen or methane as fuel which supplies the anode compartments 50.

Satisfactory operation of an HTE electrolyzer or of an SOFC fuel cell requires, inter alia, the following essential functions:

A/ good electrical insulation between two adjacent interconnectors in the stack, otherwise the individual electrochemical cell inserted between the two interconnectors will be short-circuited, B/ good leaktightness between the two separate compartments, i.e. anode and cathode compartments, otherwise the gases produced will recombine, resulting in a fall in yield and in particular in the appearance of hot spots which damage the stack, C/ good distribution of the gases both at the inlet and on recovery of the gases produced, otherwise there will be a loss of yield, nonuniformity of pressure and nonuniformity of temperature within the different individual cells, or even unacceptable deterioration of the cells.

Moreover, the operating point retained for the electrolysis reactor or the SOFC cell also sets the thermal conditions in the stack. Indeed, for electrolyses carried out at high temperature, the energy $\Delta H$ required for dissociation of the inlet molecule ($H_2O$ or $CO_2$) may be provided in electrical and/or heat form. The thermal energy provided Q is then defined as a function of the voltage U at the terminals of each electrolysis cell by the relationship:

$$Q = \frac{I}{2F}\Delta H - U \cdot I,$$

in which U is the electrical voltage, 1 is the electric current and F is the Faraday constant.

Thus, three operating regimes are defined for the electrolysis or the co-electrolysis, corresponding to three different thermal modes for the stack of cells:

the "autothermal" mode in which the imposed voltage $U_{imp}$ is equal to $\Delta H/2F$. The heat consumed by the dissociation reaction is completely compensated for by the various electrical resistances of the electrolyzer (irreversibilities). The electrolyzer does not require any particular thermal management, while at the same time remaining temperature-stable.

the "endothermic" mode in which the imposed voltage $U_{imp}$ is less than $\Delta H/2F$. The electrolyzer consumes more heat than the electrical losses therein. This required heat must thus be supplied thereto by another means, otherwise its temperature will drop irreparably.

the "exothermic" mode in which the imposed voltage $U_{imp}$ is greater than $\Delta H/2F$. The electrolysis then consumes less heat than the electrical losses via the Joule effect. This release of heat within the electrolyzer must then be discharged by another means, otherwise its temperature will increase unacceptably.

The operation of a cell supplied with methane $CH_4$, for its part, requires some precautions. Indeed, the internal reforming reaction, according to the equation $CH_4+H_2O \rightarrow 3H_2+CO$, catalyzed by cermet, in general nickel-zirconia cermet, of the electrode supplied with $CH_4$, is highly endothermic, whereas the oxidation reaction of the hydrogen within the cell is highly exothermic. Thus, cell operation may also vary from an endothermic mode to an exothermic mode depending on the ratio between the internal reforming reaction and the current density. Without particular precautions, this requires managing large thermal gradients within the stack, between the inlet and the outlet of the gases, these large thermal gradients possibly being unacceptable since they induce high mechanical stresses. Moreover, operation of an SOFC cell supplied solely with pure hydrogen rapidly leads to heating of the stack, limiting the accessible, power and the yield, if high flow rates are used for the cooling.

Thus, the electrochemical reactions required for the operation of this type of electrolyzer stack or SOFC fuel cell may be carried out under varied electrical and thermal conditions, each with their own advantages and disadvantages.

In particular, in the endothermic mode for electrolysis, less electricity is consumed but less hydrogen is produced, and heat must be supplied to the stack. The advantage of this point of operation lies in the availability of an inexpensive heat source. Everything thus depends on the nature and the temperature of this heat source and on the design of the interconnector making it possible to best utilize this heat.

In contrast, the exothermic mode for electrolysis and for the cell leads to a substantial production either of hydrogen or of electricity, but the stack must be cooled, which may be difficult to achieve and costly in terms of energy. The advantage of this exothermic mode is thus heavily dependent on the cost of the electricity and the use of the excess heat.

A significant constraint is managing as well as possible these thermal operating regimes of a fuel cell (SOFC) or of an electrolyzer (HTE). Indeed, regardless of the mode in question, the thermal gradients within the stack may be very large, which generates high mechanical stresses, which may go as far as breaking the cells and/or the seals. Moreover, if the stack is cooled incorrectly, temperatures may be reached which are too high, especially for the seals.

Now, the elements internal to the SOFC cell or to the electrolyzer, especially the individual cells, are at least partially produced from ceramic; these elements are thus very sensitive to temperature gradients and are not capable of withstanding a thermal shock, or too large a thermal gradient (a few tens of degrees between the inlet and the outlet of the gases).

Furthermore, in order to ensure the longevity of the cell or the electrolyzed and the correct operation thereof, it is preferable to provide a distribution of the temperature within the reactor which is as homogeneous as possible. The aim is typically to have temperatures not varying by more than 10° C. to 20° C. throughout the stack.

U.S. Pat. No. 6,855,451B2 discloses an interconnector for a reactor containing an SOFC fuel cell stack, with three flat metal sheets laminated and assembled together, the periphery of which is pierced to form manifolds intended for the supply of fuel gases on one side and oxidant on the other. No thermal regulation of the stack is mentioned in this application.

Patent application US 2014/0093805 is concerned with the thermal regulation of an SOFC fuel cell containing a stack, and proposes integrated heat exchangers within the stack with one on the side of each cell cathode and one on the side of each anode.

Patent application US 2013/0130139 discloses an SOFC fuel cell containing a stack discloses a supply of fuel differentiated from a first group of electrochemical cells to a second group adjacent to the first. This solution is advantageous insofar as it makes it possible to at least partially reduce the thermal gradient along the stack. However, the supply from one group to another is necessarily in series, and only in co-current, as shown clearly in FIG. 2 of this application. This limits the possibilities of modes of operation of the cell.

There is therefore a need to improve electrolysis or co-electrolysis reactors and SOFC fuel cells operating at high temperature, especially in order to limit the thermal gradients within their stack, with a view to improving their service life.

Moreover, this requirement for optimum cooling has an impact on the cost of the electrolysis or co-electrolysis method or the method for operating an SOFC fuel cell. Indeed, high air flow rates for the purposes of cooling lead to too high an electrical consumption of the accessories.

There is therefore a need to reduce the cost of cooling electrolysis or co-electrolysis reactors and SOFC fuel cells operating at high temperature.

One aim of the invention is to at least partially meet this need.

SUMMARY OF THE INVENTION

To this end, in a first alternative, the invention relates to a method for the high-temperature electrolysis of steam $H_2O$, or for the co-electrolysis of steam $H_2O$ and of carbon dioxide $CO^2$, implemented in a reactor comprising a stack of individual electrolysis cells of solid oxide type, each formed of a cathode, of an anode and of an electrolyte inserted between the cathode and the anode, and a plurality of electrical and fluid interconnectors each arranged between two adjacent individual cells with one face thereof in electrical contact with the anode of one of the two individual cells and the other face thereof in electrical contact with the cathode of the other of the two individual cells.

In the method according to the invention:
a first zone of each interconnector of a first group is supplied with steam or with a mixture of steam $H_2O$ and of carbon dioxide $CO^2$, and it is distributed to a cathode of each individual cell of the first group, then the hydrogen $H_2$ produced or the synthesis gas (mixture of carbon monoxide CO and of hydrogen $H_2$) is recovered in a second zone of each interconnector of the first group,
a first zone of each interconnector of a second group, at least one of which is adjacent to the first group, is supplied with steam or with a mixture of steam $H_2O$ and of carbon dioxide $CO_2$, and it is distributed to a cathode of each individual cell of the second group, at least one of which is adjacent to a cell of the first group, then the hydrogen $H_2$ produced or the synthesis gas (mixture of carbon monoxide CO and of hydrogen $H_2$) is recovered in a second zone of each interconnector of the second group, the first and second zones of the interconnectors of the second group not being located vertically in line respectively with the first and second zones of the interconnectors of the first group.

According to the method of the invention, within the stack, the supply and the circulation respectively to the interconnectors and to the cells of the first group are carried out independently relative to the supply and circulation respectively to the interconnectors and to the cells of the second group.

According to one variant, the first and second zones of the first and second groups of interconnectors are arranged such that the distribution of the steam or of the mixture of steam $H_2O$ and of carbon dioxide $CO_2$ to the cathode of the cells of the first group is carried out in co-current to the distribution to the cells of the second group.

Alternatively, the first and second zones of the first and second groups of interconnectors are arranged such that the distribution of the steam or of the mixture of steam $H_2O$ and of carbon dioxide $CO_2$ to the cathode of the cells of the first group is carried out in counter-current to the distribution to the cells of the second group.

According to a first advantageous embodiment:
a third zone of each interconnector of the first group is supplied with draining gas such as air (E1(O2)), and it is distributed to the anode of each cell of the first group, then the oxygen $O_2$ produced and, where appropriate, the draining gas (S1(O2)) is (are) recovered in a fourth zone of each interconnector of the first group,
a third zone of each interconnector of the second group is supplied with draining gas such as air (E2(O2)), and it is distributed to the anode of each cell of the second group, then the oxygen $O_2$ produced (S2(O2)) and, where appropriate, the draining gas is (are) recovered in a fourth zone of each interconnector of the second group, the third and fourth zones of the second group of interconnectors being located vertically in line respectively with the third and fourth zones of the first group of interconnectors, so as to have a supply of draining gas and a recovery of oxygen produced which are common to the first and second group.

According to a second advantageous embodiment:
a third zone of each interconnector of the first group is supplied with draining gas such as air (E1(O2)), and it is distributed to the anode of each cell of the first group, then the oxygen $O_2$ produced and, where appropriate, the draining gas (S1(O2)) is (are) recovered in a fourth zone of each interconnector of the first group,
a third zone of each interconnector of the second group is supplied with draining gas such as air (E2(O2)), and it is distributed to the anode of each cell of the second group, then the oxygen $O_2$ produced (S2(O2)) and, where appropriate, the draining gas is (are) recovered in a fourth zone of each interconnector of the second group, the third and fourth zones of the second group of interconnectors not being located vertically in line respectively with the third and fourth zones of the first group of interconnectors, so as to have a supply of draining gas and a recovery of oxygen produced which are separate between the first group and the second group.

According to this second embodiment, the third and fourth zones of the first and second group of interconnectors are arranged such that the distribution of the draining gas and of the $O_2$ produced by electrolysis at the anode of the cells of the first group is carried out in counter-current to the distribution of the cells of the second group.

In a second alternative, the invention also relates to a method for producing electricity at high temperature, implemented in a solid oxide fuel cell (SOFC) comprising a stack of individual electrochemical cells of SOFC type, each formed of a cathode, of an anode and of an electrolyte inserted between the cathode and the anode, and a plurality of electrical and fluid interconnectors each arranged between two adjacent individual cells with one face thereof in electrical contact with the anode of one of the two individual cells and the other face thereof in electrical contact with the cathode of the other of the two individual cells.

In the method according to the invention:
a first zone of each interconnector of a first group is supplied with fuel, and it is distributed to an anode of each individual cell of the first group, then the surplus fuel and the water produced are recovered in a second zone of each interconnector of the first group, a first zone of each interconnector of a second group, at least one of which is adjacent to an interconnector of the first group, is supplied with fuel, and it is distributed to an anode of each individual cell of the second group, at least one of which is adjacent to a cell of the first group, then the surplus fuel and the water produced are recovered in a second zone of each interconnector of the second group, the first and second zones of the interconnectors of the second group not being located vertically in line respectively with the first and second zones of the interconnectors of the first group.

According to the method of the invention, within the stack, the supply and the circulation respectively to the interconnectors and to the cells of the first group are carried out independently relative to the supply and circulation respectively to the interconnectors and to the cells of the second group.

According to a variant, the first and second zones of the first and second group of interconnectors are arranged such that the distribution of the fuel to the anode of the cells of the first group is carried out in co-current to the distribution to the cells of the second group.

Alternatively, the first and second zones of the first and second groups of interconnectors are arranged such that the distribution of the fuel to the anode of the cells of the first group is carried out in counter-current to the distribution to the cells of the second group.

According to a first advantageous embodiment:
a third zone of each interconnector of the first group is supplied with oxidizer such as air (E1(O2)), and it is distributed to the cathode of each cell of the first group, then the surplus oxidizer (S1(O2)) is recovered in a fourth zone of each interconnector of the first group, a third of each interconnector of the second group is supplied with oxidizer such as air (E2(O2)), and it is distributed to the cathode of each cell of the second group, then the surplus oxidizer (S2(O2)) is recovered in a fourth zone of each interconnector of the second group, the third and fourth zones of the second group of interconnectors being located vertically in line respectively with the third and fourth zones of the first group of interconnectors, so as to have a supply of oxidizer and a recovery of surplus oxidizer which are common to the first and second groups.

According to a second advantageous embodiment:
a third zone of each interconnector of the first group is supplied with oxidizer such as air (E1(O2)), and it is distributed to the cathode of each cell of the first group, then the surplus oxidizer (S1(O2)) is recovered in a fourth zone of each interconnector of the first group, a third zone of each interconnector of the second group is supplied with oxidizer such as air (E2(O2)), and it is distributed to the cathode of each cell of the second group, then the surplus oxidizer (S2(O2)) is recovered in a fourth zone of each interconnector of the second group, the third and fourth zones of the second group of interconnectors not being located vertically in line respectively with the third and fourth zones of the first group of interconnectors, so as to have a supply of oxidizer and a recovery of surplus oxidizer which are separate between the first group and the second group.

According to this second mode, the third and fourth zones of the first and second group of interconnectors are arranged such that the distribution of the oxidizer to the cathode of the cells of the first group is carried out in counter-current to the distribution of the cells of the second group.

The fuel may advantageously be hydrogen or methane ($CH_4$) or a mixture of the two.

In other words, two adjacent cells or two adjacent groups of cells are electrically in series as usual, but supplied by two columns for supplying fuel gas, usually referred to as manifolds, passing through the assembly of interconnectors and leaktightness frames and which are independent of one another in the stack, just like the two manifolds for recovering the gases (either $H_2$ or synthesis gas produced for the electrolyzer, or the surplus fuel for the cell).

Thus, the invention essentially consists in carrying out a supply of fuel (either steam or a mixture of steam with $CO_2$, or $H_2$ or $CH_4$) by zones which are distinct between a cell or a group of stacked cells and an adjacent cell or group of adjacent stacked cells within the same (co)electrolysis reactor or an SOFC fuel cell.

It is then possible to carry out supply/recovery of the gases for the two adjacent cells or two adjacent groups of cells either in parallel, by keeping the manifolds separate from one another, affording independent supply for each of the groups, or in series, by connecting them to one another outside the stack.

It is also possible to envisage shifting from a supply/recovery mode in parallel to a mode in series, and vice-versa, during the operation of the electrolyzer or of the cell.

This enables greater flexibility of operation. Indeed, the passage from the supply mode in parallel to that in series makes it possible to increase the length of the reaction channel for the same electrochemical cell active area. This may promote internal reforming at a higher flow rate, for example, in an SOFC cell. In the series mode, it is possible to provide supplemental fuel and/or oxidizer (or draining gas) from one and/or the other of the two adjacent cells or two adjacent groups of cells.

The series mode is first and foremost intended to increase the use of fuel in, the cell mode so as to maximize the yield.

However, on the other hand, the parallel mode supplied independently enables better flexibility in terms of power and management over the course of the ageing of each of the stacks.

The proposed invention makes it possible to go from a series mode to a parallel mode, thereby making it possible to optimize either the yield (series) or the power (parallel).

According to the invention, with supplies/recoveries of the fuel gases which are distinct between a cell or a group of stacked cells and an adjacent cell or a group of adjacent stacked cells, management of thermal operation is greatly improved and the thermal gradients within the stack of the electrolyzer or of the SOFC fuel cell are considerably reduced compared to the state of the art.

As described below, the two distributions of the fuel gases over the cells or adjacent groups of cells may be in co-current or in counter-current to one another. Circulation in counter-current between the two independent groups of interconnectors/cells advantageously makes it possible to greatly limit the thermal, gradients within the stack since the zone of outlet of the gases from a cell or from a group of cells is then situated close to the inlet of the adjacent cell or group, and vice-versa.

In addition, it is possible to envisage a supply/recovery of the oxidizer or draining gases which is common to the two cells or adjacent groups of cells, or separate, especially for operation in SOFC cell mode.

When the supply/recovery of the oxidizer or draining gases is separate, their distributions over the cells or adjacent groups of cells may again be in counter-current so as to yet further reduce the thermal gradients.

The interconnectors envisaged in the context of the invention make it possible to preserve a cross-current circulation of the gases over the cells between the fuel and the oxidizer or draining gas.

The methods according to the invention do not modify the reversibility of a stack reactor which may be used equally well as an electrolysis or co-electrolysis reactor or as an SOFC cell, with hydrogen or methane as fuel.

In summary, the methods according to the invention have numerous characteristics and advantages, among which mention may be made of:
- a supply/distribution of fuel gas which may be in series or in parallel for two cells or adjacent groups of cells, by producing two manifolds which are independent in the stack but which may be connected together outside the stack;
- completely integrated management of the thermal operations;
- in a supply/distribution in series, an increase in the length of the reaction channel for the same useful area of electrochemical cell, which may promote catalytic reactions such as internal reforming at a high flow rate of $CH_4$ in an SOFC cell and increase the rate of use;
- possibility to shift from the series mode to the parallel mode in the case of ageing/damage of a group of cells requiring independent control;
- in a supply/distribution in series, the possibility of enriching the cell of group of cells downstream in fuel and/or oxidizer or draining gas;
- the possibility of a circulation of the fuel gases between two cells or adjacent groups of cells in co-current or in counter-current, which makes it possible to greatly reduce the thermal gradients within the stack;
- the possibility of reaching electrolyzes or SOFC cell points of operation which were hitherto unreachable since they led to unacceptable thermal gradients;
- the possibility of having a different number of cells between two groups supplied with gas by independent manifolds, with, for, example, in a supply of one group with a smaller number of cells compared to that of the second group. The cells of the group with the smaller number may then be arranged either all solely in the center of the stack, alternating with those of the group with the greater number, or by being distributed over the entire height of the stack, alternating with cells of the group with the greater number.

"Cathode-supported cell" (CSC) is used here and in the context of the invention according to the definition already given in the field of high-temperature electrolysis HTE of water, that is to say to mean a cell in which the electrolyte and the oxygen electrode (anode) are arranged on the thicker hydrogen or carbon monoxide electrode (cathode) which thus serves as support.

According to a first embodiment, the supply of the gases in the first zone of the first group of interconnectors is connected in series to the supply of the gases in the first zone of the second group of interconnectors.

According to this first embodiment, the gases may be enriched in fuel and/or in oxidizer between the outlet of the first group and the inlet of the second group, or vice-versa.

Advantageously, cells of different sizes between the first and the second groups are used, so that all the cells are at the same voltage with different fuel compositions. It is specified here that it goes without saying that the cells at the same voltage do not have the same current density, but, the same current.

According to a second embodiment, the supply of the gases in the first zone of the first interconnector is in parallel to the supply of the gases in the first zone of the second interconnector.

According to this second mode, the first and second groups may be supplied with compositions and flow rates of gas are identical.

Advantageously, in fuel cell mode, the first and the second groups are supplied with different compositions of methane ($CH_2$) or hydrogen ($H_2$) so as to have different reforming between the two groups.

Further advantageously, in co-electrolysis of steam $H_2O$ and of carbon dioxide $CO_2$, the first and the second group are supplied with the same $H_2O/CO_2/CO$ ratio.

According to one advantageous characteristic, in operation, the supply in series is changed into supply in parallel, and according to which the flow rates and compositions are simultaneously made different between the two groups so as to manage a premature degradation of the cells of one of the two groups.

DETAILED DESCRIPTION

Figure 6A:
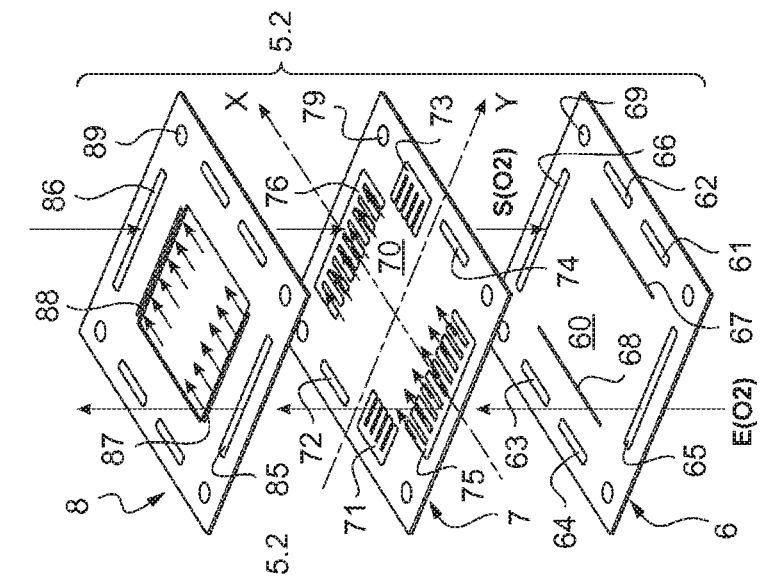
Figure 6B:
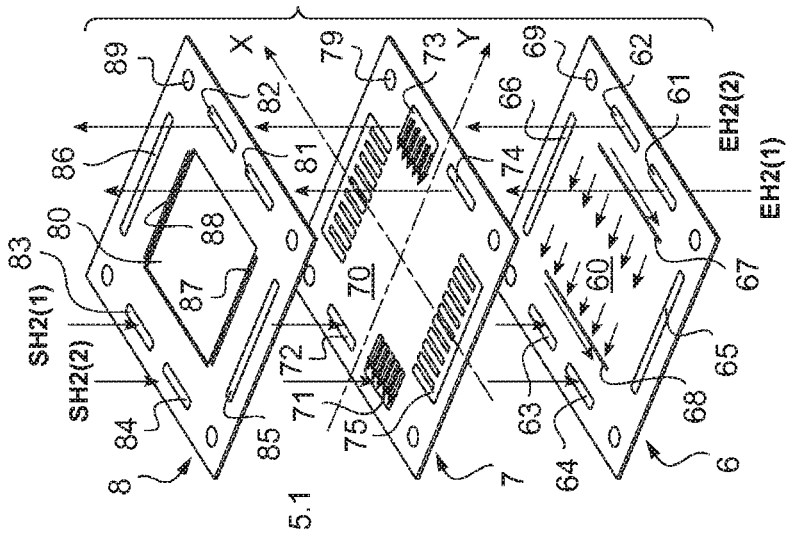
Figure 6C:
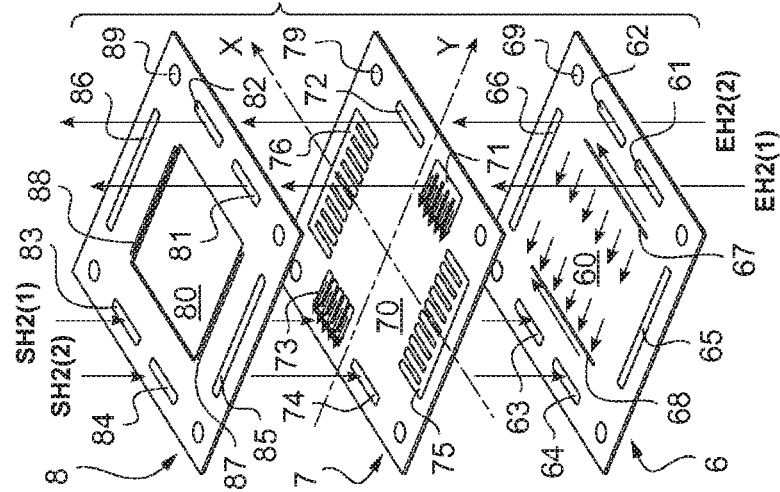
Figure 8A:
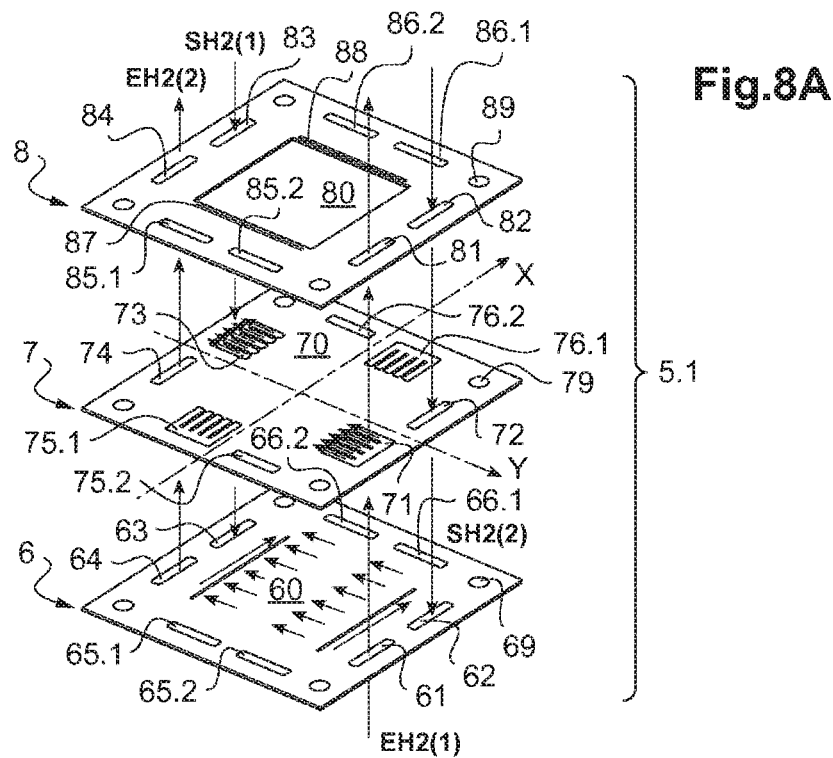
Figure 8B:
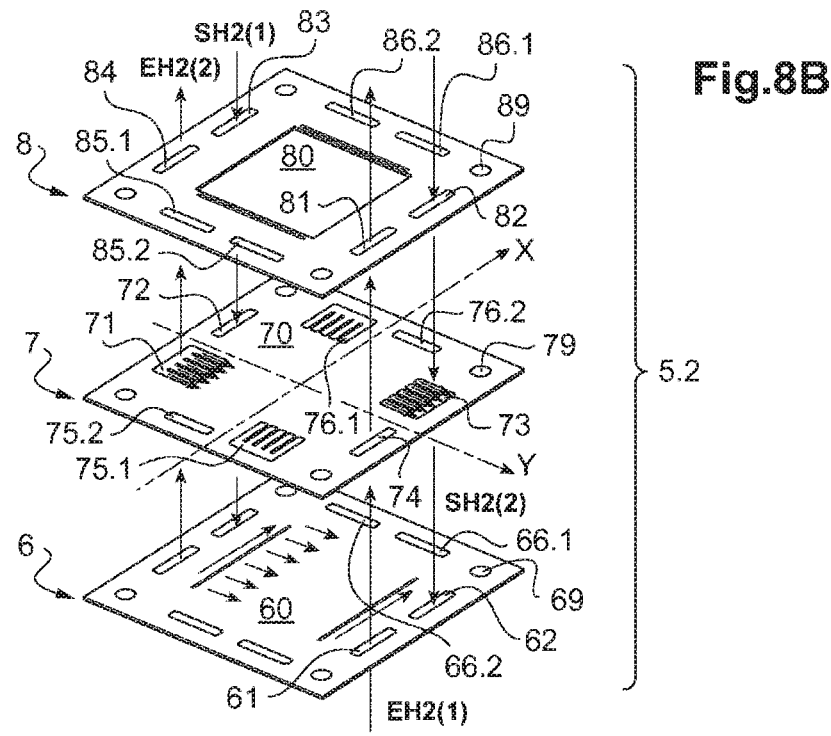
Figure 11A:
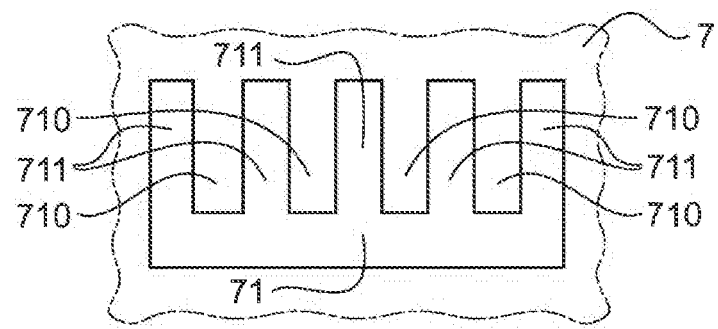
Figure 11B:
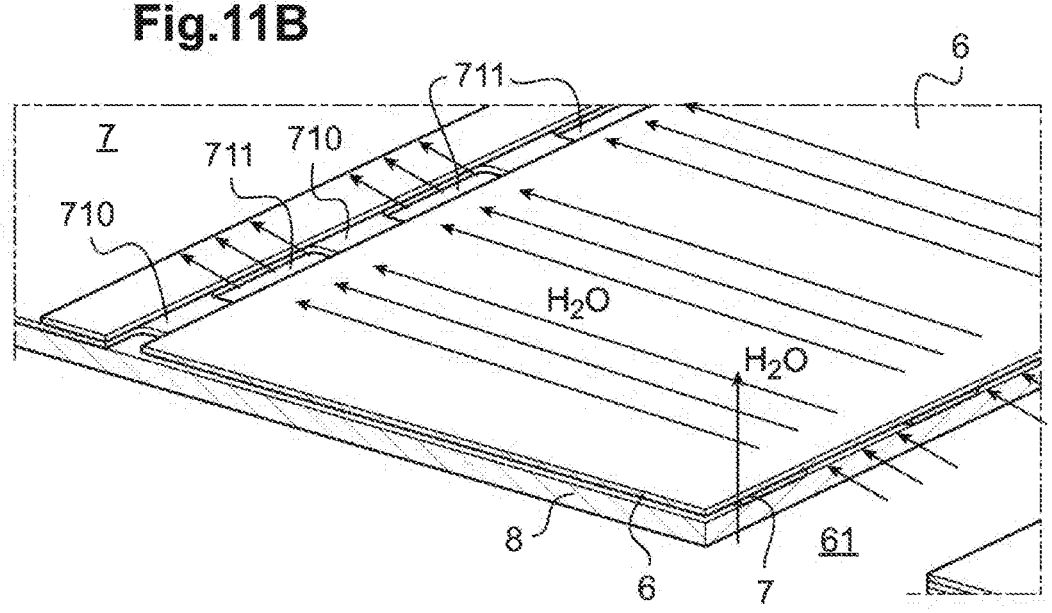

Other advantages and features of the invention will become more clearly apparent on reading the detailed description of examples of implementation of the invention, given by way of non-limiting illustration with reference to the following figures, in which:

FIG. 1 is a schematic view showing the operating principle of a high-temperature water electrolyzer:

FIG. 2 is a schematic exploded view of a part of a high-temperature steam electrolyzer comprising interconnectors according to the state of the art, FIG. 3 is a schematic sectional view of an electrolysis reactor implementing the method for high-temperature electrolysis according to one mode of the invention, FIG. 4 is a schematic sectional view of an electrolysis reactor implementing the method for high-temperature electrolysis according to another mode of the invention, FIG. 5 is an exploded view of a part of an electrolysis reactor according to the invention with interconnectors enabling independent supply and circulation of steam in counter-current from one electrolysis cell relative to the adjacent cell, FIGS. 6A and 6B are exploded views of two interconnectors according to the invention which enable a supply/recovery of the steam and of the hydrogen produced, separate and in co-current from one electrolysis cell to an adjacent cell, and a supply/recovery of the draining gas and of the oxygen produced, common between the two adjacent cells, the figures showing the supply, distribution and recovery of the steam and of the hydrogen produced, FIG. 6C is an exploded view of one of the two interconnectors according to FIGS. 6A and 6B, showing the supply, distribution and recovery of the draining gas and of the oxygen produced, FIGS. 7A and 7B are exploded views of two interconnectors according to the invention which enable a supply/recovery of the steam and of the hydrogen produced, separate and in counter-current from one electrolysis cell to an adjacent cell, and a supply/recovery of the draining gas and of the oxygen produced, common between the two adjacent cells, the figures showing the supply, distribution and recovery of the steam and of the hydrogen produced, FIGS. 8A and 8B are exploded views of two interconnectors according to the invention which enable a supply/recovery of the steam and of the hydrogen produced, separate and in counter-current from one electrolysis cell to an adjacent cell, and a supply/recovery of the draining gas and of the oxygen produced, also separate and in counter-current from one electrolysis cell to an adjacent cell, the figures showing the supply, distribution and recovery of the steam and of the hydrogen produced, FIGS. 9A and 9B are identical, respectively, to FIGS. 8A and 8B, but show the supply, distribution and recovery of the draining gas and of the oxygen produced, FIG. 10 is a perspective view of an interconnector according to FIGS. 7A and 7B, FIG. 10A is a front view of an end metal sheet of an interconnector according to FIG. 7A, showing the supply, distribution and recovery of the steam and of the hydrogen produced, FIG. 10B is a front view of an end metal sheet of an interconnector according to FIG. 7A, showing the supply, distribution and recovery of the steam and of the hydrogen produced, FIG. 10C is a front view of an end metal sheet of an interconnector according to FIG. 7B, showing the supply, distribution and recovery of the draining gas and of the oxygen produced, FIGS. 11A and 11B are detail views of a part of an interconnector according to the invention.

It is specified here that, in all of FIGS. 1 to 11B, the symbols and arrows of supply firstly of steam $H_2O$, of distribution and recovery of dihydrogen $H_2$ and of oxygen $O_2$, and of the current are shown for the purposes of clarity and precision, to illustrate the operation of a steam electrolysis reactor according to the state of the art and of a steam electrolysis reactor according to the invention.

It is also specified that, throughout the application, the terms "above", "below", "vertically in line with", "vertical", "lower", "upper", "bottom", "top", "below" and "above" should be understood with reference to an HTE reactor or an SOFC cell in the vertical configuration in operation, that is to say with the planes of interconnectors and electrochemical cells being horizontal.

It is finally specified that all the electrolyzers described are of solid oxide type (SOEC, acronym for Solid Oxide Electrolysis Cell) operating at high temperature. The high operating temperature of an electrolyzes (electrolysis reactor) is typically between 600° C. and 950° C.

Typically, the characteristics of an individual SOEC electrolysis cell suitable for the invention, of the cathode-supported type (CSC), may be those indicated as follows in the table below.

TABLE

| Electrolysis cell | Unit | Value |
|---|---|---|
| Cathode 2 | | |
| Constituent material | | Ni—YSZ |
| Thickness | μm | 315 |
| Thermal conductivity | $Wm^{-1} K^{-1}$ | 13.1 |
| Electrical conductivity | $\Omega^{-1} m^{-1}$ | $10^5$ |
| Porosity | | 0.37 |
| Permeability | $m^2$ | $10^{-13}$ |
| Tortuosity | | 4 |
| Current density | $A \cdot m^{-2}$ | 5300 |
| Anode 4 | | |
| Constituent material | | LSM |
| Thickness | μm | 20 |
| Thermal conductivity | $Wm^{-1} K^{-1}$ | 9.6 |
| Electrical conductivity | $\Omega^{-1} m^{-1}$ | $1\ 10^4$ |
| Porosity | | 0.37 |
| Permeability | $m^2$ | $10^{-13}$ |
| Tortuosity | | 4 |
| Current density | $A \cdot m^{-2}$ | 2000 |
| Electrolyte 3 | | |
| Constituent material | | YSZ |
| Thickness | μm | 90 μm in support electrolyte and 5 μm in support electrode |
| Resistivity | Ωm | 0.42 |

FIGS. 1 and 2 have already been described in detail in the preamble. They are therefore not described hereafter.

By convention, and in order to facilitate the reading of the circulations of the gases in the different figures, the following symbols are used:

EH2(1): denotes the circulation, through the stack, of the steam supplying an electrolysis cell or a group of electrolysis cells C1;

SH2(1): denotes the circulation, through the stack, of the hydrogen produced at an electrolysis cell or a group of electrolysis cells C1;

EH2(2): denotes the circulation, through the stack, of the steam supplying an electrolysis cell or a group of electrolysis cells C2;

SH2(2): denotes the circulation, through the stack, of the hydrogen produced at an electrolysis cell or a group of electrolysis cells C2;

E1($O_2$): denotes the circulation, through the stack, of the draining gas supplying an electrolysis cell or a group of electrolysis cells C1;

S1($O_2$): denotes the circulation, through the stack, of the oxygen produced at an electrolysis cell or a group of electrolysis cells C1;

E2($O_2$): denotes the circulation, through the stack, of the draining gas supplying an electrolysis cell or a group of electrolysis cells C2;

S2($O_2$): denotes the circulation, through the stack, of the oxygen produced at an electrolysis cell or a group of electrolysis cells C2.

In order to improve the management of the thermal operations of the electrolysis reactor and to reduce the thermal gradients therein, the inventors of the present invention had the idea of carrying out a circulation of the fuel gas, i.e. the steam, and of the hydrogen produced within each interconnector 5.1, 5.2 of the stack, such that the distribution at a cell C1 or group of cells is separate from that at a cell C2 or adjacent group of cells.

For this purpose, as illustrated in FIG. 3:

steam EH2(1) is supplied in a first zone of each interconnector 5.1 (on the left in FIG. 3), and it is distributed to a cathode of the cells C1, then the hydrogen $H_2$ produced is recovered in a second zone of the interconnectors 5.1 (on the right in FIG. 3).

steam EH2(2) is supplied in a first zone of each interconnector 5.2, each adjacent to an interconnector 5.1 (on the right in FIG. 3), and it is distributed to a cathode of the cells C2, each adjacent to the cell C1, then the hydrogen $H_2$ produced is recovered in a second zone of the interconnectors 5.2 (on the left in FIG. 3).

All the first and second zones of the interconnectors 5.2 are not situated vertically in line respectively with first and second zones of the interconnectors 5.1.

As illustrated in FIGS. 3 and 5, it is possible to provide for producing the interconnectors 5.1, 5.2, in order to arrange the different zones for supply and recovery of the steam and of the hydrogen produced such that their circulation at the cells C1 is in counter-current to the circulation at the cells C2. This circulation may also be in co-current, as illustrated in FIGS. 6A and 6B.

The interconnectors 5.1, 5.2 may also be produced in order to arrange the different zones for supply and recovery of the draining gas and of the oxygen produced such that their circulation at the cells C1 is in co-current (FIGS. 3 and 5) to the circulation at the cells C2, or in counter-current thereto (FIG. 4).

FIG. 5 shows a schematic representation of a part of a high-temperature solid oxide electrolyzer (SOEC) according to the invention.

This electrolyzer electrolysis reactor comprises a stack of individual electrolysis cells of SOEC type (C1, C2), each formed from a cathode 2.1, 2.2, from an anode 4.1, 4.2, and from an electrolyte 3.1, 3.2, inserted between the cathode and the anode.

A fluid and electrical interconnector 5.1, 5.2 is arranged between two adjacent individual cells C1, C2, with one face thereof in electrical contact with the anode of one of the two individual cells and the other face thereof in electrical contact with the cathode of the other of the two individual cells.

As shown in FIG. 5, insulation and leaktightness frames 9 are also provided, making it possible to provide electrical insulation between interconnectors 5.1 and 5.2. Each frame 9 is pierced with ports 99, suitable for accommodating rods for fixing the stack, and also seals 10 provided to produce leaktightness around the ports for supplying the gases in electrolysis or co-electrolysis, $H_2O$, $CO_2$, air, and for recovering the gases produced, $H_2$, CO, $O_2$ with air.

The same electrical current passes through all the electrolysis cells C1 and C2.

In the reactor according to the invention, all the cathode compartments 50 of the group of cells C1, in which the steam $H_2O$ supplied and the hydrogen $H_2$ produced circulate, communicate with one another. Similarly, all the cathode compartments 50 of the group of cells C2, in which $H_2O/H_2$, also circulate, communicate with one another, but are completely isolated from the compartments 50 intended for the group of cells C1.

Finally, the two simultaneous but separate electrolysis reactions both produce oxygen, which is collected by all the anode compartments 51 which communicate or do not communicate with one another. Thus, as is described in detail below, as a function of the design of the ports intended for discharging, the oxygen, it is possible to carry out a collection of oxygen which is common to all the cells or, conversely, a collection which is separate from one cell C1 relative to the other, adjacent cell C2.

According to the invention, an interconnector 5.1 is different from an adjacent interconnector 5.2 in order to be able to carry out a supply of steam and a recovery of hydrogen produced at a cell C1 which is distinct from that carried out at a cell C2.

Thus, as illustrated in FIG. 5, the circulation of the hydrogen/steam through the stack and at the cell C1 is separate from the circulation through the stack and at the cell C2.

FIG. 6A shows an exploded view of an interconnector 5.1 according to the invention, making it possible to provide the supply of steam $H_2O$, the circulation of steam and of the hydrogen produced at the cell C1 and also the recovery of the oxygen $O_2$ produced within the stack of an electrolysis reactor. As described in detail below, the interconnector 5 makes it possible to provide a circulation of the gas ($H_2O/H_2$) to the cathodes of the cells at 90° cross-current with the circulation of the recovered gas ($O_2$ and the draining gas) at the anode of the cell C1.

The interconnector 5.1 consists of three flat metal sheets 6, 7, 8, elongated along two axes of symmetry (X, Y) orthogonal to one another, the flat metal sheets being laminated and assembled together by welding. A central metal sheet 7 is inserted between a first 6 and a second 8 end metal sheet.

The first 6 end metal sheet is intended to come into mechanical contact with the plane of a cathode 2.1 of an individual electrolysis cell C1 and the central metal sheet 7 is intended to come into mechanical contact with the plane of an anode 4.1 of an adjacent individual electrolysis cell, each of the two adjacent individual electrolysis cells (C1, C2) of SOEC type being formed from a cathode 2.1, 2.2, from an anode 4.1, 4.2, and from an electrolyte 3.1, 3.2, inserted between the cathode and the anode.

Each of the three flat metal sheets 6, 7, 8 comprises a central part 60, 70, 80.

The central parts 60, 70 of the central metal sheet 7 and of the first end metal sheet 6 are not pierced, while the central part 80 of the second end metal sheet 8 is pierced.

Each metal sheet 6, 7, 8 is pierced, at the periphery of the central part thereof with six ports 61, 62, 63, 64, 65, 66; 71, 72, 73, 74, 75, 76; 81, 82, 83, 84, 85, 86.

The first 61, 71, 81 to fourth 64, 74, 84 ports of each metal sheet are elongated over a length corresponding to a portion of the length of the central part 60, 70, 80 along one of the axes X of the metal sheets, and are distributed pairwise on either side of said axis X.

The fifth 65, 75, 85 port is elongated over a length corresponding substantially to the length of the central part 60, 70, 80 along, the other of the axes Y.

The sixth 66, 76, 86 port is elongated over a length corresponding substantially to the length of the central part 60, 70, 80 along the other of the axes Y.

The first 6 end metal sheet also comprises a seventh 67 and an eighth 68 port arranged symmetrically on either side of the axis X, inside its first to fourth ports 61 to 64, and are elongated over a length corresponding substantially to the length of the central part along the axis X.

The second 8 end metal sheet also comprises a seventh 87 and an eighth 88 port inside, respectively, its fifth 85 and its sixth 86 port, and elongated over a length corresponding substantially to the length of the central part along said axis Y.

As can be seen in FIG. 6A, the first 71, third 73, fifth 75 and sixth 76 ports of the central metal sheet 7 are widened relative, respectively, to the first 61, 81, third 63, 83, fifth 65, 85 and sixth 66, 86 ports of each end metal sheet 6, 8.

The second 62, 72, 82 and fourth 64, 74, 84 ports of the three metal sheets are of substantially identical dimensions to one another.

The lamination and the assembly of the three metal sheets 6, 7, 8 with one another are carried out such that:

- each of the first to sixth 61 to 66 ports of one of the three metal sheets is individually in fluid communication respectively with one of the corresponding first to sixth 71 to 76 and 81 to 86 ports of the two other metal sheets 7, 8,
- the first port 61 of the first 6 end metal sheet is in fluid communication with the seventh port 67 of the first 6 end metal sheet via the first port 71 of the central metal sheet 7,
- the third port 63 of the first 6 end metal sheet is in fluid communication with the eighth port 68 of the first 6 end metal sheet via the third port 73 of the central metal sheet 7,
- the fifth 85 and the seventh 87 ports of the second 8 end metal sheet are in fluid communication via the fifth 75 port of the central metal sheet 7,
- the sixth 86 and the eighth 88 ports of the second 8 end metal sheet are in fluid communication via the sixth 76 port of the central metal sheet 7.

FIGS. 11A and 11B show in detail the production of the comb formed by the tongues of metal sheet 710 at the widened slit 71 of the central metal sheet and its arrangement between the two end metal sheets 6, 8 in order to enable the supply of an electrolysis cell, here with steam $H_2O$. Thus, the comb formed 710, 711 enables the steam to pass from the supply manifold 61, 71, 81 to the distribution slit 67, by passing into the space between the two end metal sheets 6, 8. The thickness of the central metal sheet 7 at this comb 710, 711 provides it with a spacer function and thereby guarantees the height of the passage for the steam into the space between the end metal sheets 6, 8. Such a passage of gases according to the invention via the inside of the interconnector 5.1 has the advantage of liberating a flat surface for producing seals. In addition, by virtue of these comb forms for the widened slits 71, 75 a homogeneous distribution is obtained of each gas ($H_2O$, $CO_2$, air) over the electrolysis cell, and by virtue of these comb forms for the widened slits 73, 76 a recovery is obtained of the gas produced ($H_2$, $CO$, $O_2$). These homogeneous distributions or recoveries or, in other words, these distributions or recoveries which are uniform in terms of flow rate over the surface of the cell are shown in the different FIGS. 6A to 10C in the form of small arrows spaced apart from one another.

In order to produce the interconnector 5.2 represented in FIG. 6B, which is intended for steam electrolysis at the cell C2, the same three flat metal sheets 6, 7, 8 are used as those used for producing the interconnector 5.2, but the central metal sheet 7 is merely turned upside down before its lamination and assembly with the two end metal sheets 6, 8.

Thus, in the interconnector 5.2, the three metal sheets 6, 7, 8 are laminated and assembled together such that:

- each of the first to sixth 61 to 66 ports of one of the three metal sheets is individually in fluid communication respectively with one of the corresponding first to sixth 71 to 76 and 81 to 86 ports of the two other metal sheets 7, 8,
- the second port 62 of the first 6 end metal sheet is in fluid communication with the seventh 67 port of the first 6 end metal sheet via the third 73 port of the central metal sheet 7,
- the fourth port 64 of the first 6 end metal sheet is in fluid communication with the eighth 68 port of the first 6 end metal sheet via the first 71 port of the central metal sheet 7,
- the fifth 85 and the seventh 87 ports of the second 8 end metal sheet are in fluid communication via the fifth 75 port of the central metal sheet 7,
- the sixth 86 and the eighth 88 ports of the second 8 end metal sheet are in fluid communication via the sixth 76 port of the central metal sheet 7.

The operating method of an electrolysis reactor according to the invention, as has just been described, will now be described with reference to FIGS. 6A and 6B.

The first 61, 71, 81 ports of the interconnector 5.1 are supplied with steam EH2(1) and simultaneously but separately the second 62, 72, 82 ports of the interconnector 5.1 are also supplied with steam EH2(2).

The steam EH2(2) passes through the interconnector 5.1 without being distributed to the cathode 2.1 of the cell C1. It supplies the ports 62, 73 and 82 of the interconnector 5.2.

Similarly, the steam EH2(1) passes through the interconnector 5.2 without being distributed to the cathode 2.2 of the cell C2.

The path, within an interconnector 5.1, of the steam injected and of the hydrogen produced, is illustrated schematically in FIGS. 6A, 7A and 8A.

The path, within an interconnector 5.2, of the steam injected and of the hydrogen produced within an interconnector 5.2, is illustrated schematically in FIGS. 6B. 7B and 8B.

In addition, the fifth 65, 75, 85 ports of the three metal sheets 8 of each interconnector 5.1, 5.2 are supplied with a draining gas E($O_2$), such as air.

The path of the air as draining gas injected and of the oxygen produced within an interconnector 5 is schematically illustrated in FIG. 6C.

The hydrogen produced SH2(1) by the steam electrolysis at the cell C1 is thus recovered in the third 63, 73, 83 ports of the interconnector 5.1 and in the third 63, 83 ports of the end metal sheets and the second port 72 of the interconnector 5.2.

The hydrogen produced SH2(2) by the steam electrolysis at the cell C2 is recovered separately in the fourth 64, 84 ports of the end metal sheets and the first port 71 of the interconnector 5.2 and in the fourth 64, 74, 84 ports of the interconnector 5.1.

Simultaneously, the oxygen $O_2$ produced S($O_2$) is recovered in the sixth 66, 76, 86 ports of the three metal sheets 8 of each interconnector 5.1, 5.2.

The supply of the steam and the recovery of the hydrogen produced and also the supply of draining gas and the recovery of oxygen produced, shown in FIGS. 6A to 6C, constitutes a co-current circulation of fuel of a cell C1 relative to the other adjacent cell C2, and a cross-current circulation with the common circulation of draining gas/ oxygen produced.

With the two types of interconnectors 1, 5.2, it is thus possible to carry out, as a variant, a counter-current circulation of fuel of a cell C1 relative to the other adjacent cell C2, and a cross-current circulation with the common circulation of draining gas/oxygen produced (FIGS. 7A and 7B).

It is thus possible to carry out a counter-current circulation of fuel of a cell C1 relative to the other adjacent cell C2, and with the circulation of draining gas/oxygen produced and separate from a cell C1 relative to the other cell C2 (FIGS. 8A and 8B). In order to carry out this separate circulation of draining gas/oxygen produced, it is then sufficient to somehow divide in two the ports 65, 75, 85 for supply of draining gas and the ports 66, 76, 86 for recovery of oxygen produced.

It is also possible to carry out a separate circulation of draining gas/oxygen produced in counter-current relative to the circulations of draining gas/oxygen of a cell C1 relative to the other adjacent cell C2. Thus, as illustrated in FIG. 9A, the draining gas E1(O2) supplies the ports 65.1, 75.1, 85.1 of the interconnector 5.1 and the oxygen produced S1($O_2$) is recovered at the ports 66.1, 76.1, 86.1. As illustrated in FIG. 9B, the draining gas E2(O2) supplies the ports 66.2, 76.1, 86.2 of the interconnector 5.2 and the oxygen produced S2(O2) is recovered at the ports 65.2, 75.1, 85.2.

FIG. 10 represents a perspective view of an interconnector 5.1 with ports 65, 75, 85 for a common circulation of draining gas and a common recovery of oxygen at the ports 66, 76, 86.

The three flat metal sheets 6, 7, 8 constituting each interconnector 5.1, 5.2 according to the invention are thin flat metal sheets, pierced and assembled with one another by welding. The thin metal sheets are preferably metal sheets less than 3 mm thick, typically with a thickness of the order of 0.2 mm. All the welds between metal sheets are produced upon manufacture and may advantageously be produced according to a transmission laser technique, which is possible due to the small thickness of the thin metal sheets, typically of the order of 0.2 mm.

All the metal sheets are advantageously made of ferritic steel with approximately 20% chromium, preferably made of CROFER® 22APU or FT18TNb. AISI 441, or based on nickel of Inconel® 600 or Haynes® type in thicknesses typically of between 0.1 and 1 mm.

Assembly by weld lines 1s around the ports between flat metal sheets 6, 7, 8 guarantees good leaktightness during operation of the electrolyzer between the steam EH2(1) conveyed to the interconnectors 5.1, the steam EH2(2) conveyed to the interconnectors 5.2, the hydrogen SH2(1) recovered at the interconnectors 5.1, the hydrogen SH2(2) recovered at the interconnectors 5.2, the draining gas conveyed E(O2) and the oxygen S(O2) recovered. The weld lines are illustrated in FIGS. 10A to 10C.

As illustrated on all the FIGS. 5 to 10C, the three metal sheets 6, 7, 8 are pierced at their periphery by additional ports 69, 79, 89 suitable for accommodating fixing rods. These fixing rods make it possible to apply a retention force to the stack of the different components of the electrolysis reactor.

Other variants and improvements may be envisaged within the context of the invention.

If, in the embodiments illustrated, there is alternation of a cell C1 with a cell C2 and thus of an interconnector 5.1 with an interconnector 5.2, it is also possible to provide, within the context of the invention, for a certain number of cells C1 and interconnectors 5.1 to be stacked and separated from the other number of these cells C1 and interconnectors 5.1 by at least one cell C2 and an interconnector C2. It is thus possible to have overlapping of the first group of cells C1 and interconnectors 5.1 with the second group of cells C2 and interconnectors, with one-by-one alternation or alternation in bundles.

It goes without saying that the invention encompasses the possibility of having n groups of cells C1, C2, ... Cn and interconnectors 5.1, 5.2, ... 5n within the same stack with supply and recovery manifolds which are independent of one another. The two cells C1 and C2 may be supplied in parallel if the manifolds remain independent upstream and downstream of the stack, or in series if they are connected to one another outside the stack. Supplementation with fuel and/or with draining gas may then be carried out between, the two cells C1, C2 in series.

As illustrated, cells of the same nature, of solid oxides type, are stacked for all the cells C1, C2. The number of cells per group and their respective size may be different depending on the application: the current is identical for all the cells, but the choice to be at the same voltage or not for different gas conditions may determine the size ratio of cells C1 and cells C2 and also the number thereof.

The invention claimed is:

1. A method for high-temperature electrolysis of steam, or for co-electrolysis of steam and of carbon dioxide, implemented in a reactor comprising:
    a stack of individual electrolysis cells of a solid oxide type, each comprising a cathode, an anode and an electrolyte inserted between the cathode and the anode, and
    a plurality of electrical and fluid interconnectors, each arranged between two adjacent individual electrolysis cells with one face thereof in electrical contact with the anode of one of the two adjacent individual electrolysis cells and the other face thereof in electrical contact with the cathode of the other of the two adjacent individual electrolysis cells, the method comprising:
    supplying a first zone of each electrical and fluid interconnector of a first group with steam or with a mixture of steam and of carbon dioxide, and distributing it to a cathode of each individual electrolysis cell of the first group, then recovering hydrogen produced or a synthesis gas, which is a mixture of carbon monoxide and of hydrogen in a second zone of the each electrical and fluid interconnector of the first group, and
    supplying a first zone of each electrical and fluid interconnector of a second group, at least one of which is adjacent to the electrical and fluid interconnector of the first group, with steam or with a mixture of steam and of carbon dioxide, and distributing it to a cathode of each individual electrolysis cell of the second group, at least one of which is adjacent to the electrolysis cell of the first group, then recovering hydrogen produced or a synthesis gas, which is a mixture of carbon monoxide and of hydrogen in a second zone of the each electrical and fluid interconnector of the second group, the first and second zones of the electrical and fluid interconnectors of the second group not being located vertically in line respectively with the first and second zones of the electrical and fluid interconnectors of the first, group,
    wherein, within the stack, the supplying and a circulation respectively to the electrical and fluid interconnectors and to the electrolysis cells of the first group are carried out independently relative to the supplying and a circulation respectively to the electrical and fluid interconnectors and to the electrolysis cells of the second group.

2. The method of claim 1, wherein the first and second zones of the electrical and fluid interconnectors of the first and second groups are arranged such that the distributing the steam or of the mixture of steam and of carbon dioxide to the cathode of the electrolysis cells of the first group is carried out in co-current to the to the electrolysis cells of the second group.

3. The method of claim 1, wherein the first and second zones of the first and second groups of the electrical and fluid interconnectors are arranged such that the distributing the steam or of the mixture of steam and of carbon dioxide to the cathode of the electrolysis cells of the first group is carried out in counter-current to the distributing to the electrolysis cells of the second group.

4. The method of claim 1, the method further comprising:
supplying a third zone of the each electrical and fluid interconnector of the first group with a draining gas, and distributing it to the anode of the each electrolysis cell of the first group, then recovering oxygen produced and, where appropriate, the draining gas in a fourth zone of the each electrical and fluid interconnector of the first group, and
supplying a third zone of the each electrical and fluid interconnector of the second group with a draining gas, and distributing it to the anode of the each electrolysis cell of the second group, then recovering oxygen produced and, where appropriate, the draining gas in a fourth zone of the each electrical and fluid interconnector of the second group, the third and fourth zones of the electrical and fluid interconnectors of the second group being located vertically in line respectively with the third and fourth zones of the electrical and fluid interconnectors of the first group, so as to have a supply of draining gas and a recovery of oxygen produced which are common to the first and second groups.

5. The method of claim 1, the method further comprising:
supplying a third zone of the each electrical and fluid interconnector of the first group with a draining gas, and distributing it to the anode of the each electrolysis cell f the first group, then recovering oxygen produced and, where appropriate, the draining gas in a fourth zone of the each electrical and fluid interconnector of the first group, and
supplying a third zone of the each electrical and fluid interconnector of the second group with a draining gas, and distributing it to the anode of the each electrolysis cell of the second group, then recovering oxygen produced and, where appropriate, the draining gas in a fourth zone of the each electrical and fluid interconnector of the second group, the third and fourth zones of the electrical and fluid interconnectors of the second group not being located vertically in line respectively with the third and fourth zones of the electrical and fluid interconnectors of the first group, so as to have a supply of draining gas and a recovery of oxygen produced which are separate between the first group and the second group.

6. The method of claim 5, wherein the third and fourth zones of the electrical and fluid interconnectors of the first and second groups are arranged such that the distributing the draining gas and of the oxygen produced by electrolysis at the anode of the electrolysis cells of the first group is carried out in counter-current to the distributing the electrolysis cells of the second group.

7. A method for producing electricity a high temperature, implemented in a solid oxide fuel cell comprising:
a stack of individual electrochemical cells of an SOFC type, each comprising a cathode, an anode and an electrolyte inserted between the cathode and the anode, and
a plurality of electrical and fluid interconnectors, each arranged between two adjacent individual electrochemical cells with one face thereof in electrical contact with the anode of one of the two adjacent individual electrochemical cells and the other face thereof in electrical contact with the cathode of the other of the two adjacent individual electrochemical cells, the method comprising:
supplying a first zone of each electrical and fluid interconnector of a first group with fuel, and distributing it to an anode of each individual electrochemical cell of the first group, then recovering surplus fuel and water produced in a second zone of the each electrical and fluid interconnector of the first group, and
supplying a first zone of each electrical and fluid interconnector of a second group, at least one of which is adjacent to the each electrical and fluid interconnector of the first group, with fuel, and distributing it to an anode of each individual electrochemical cell of the second group, at least one of which is adjacent to the electrochemical cell of the first group, then recovering surplus fuel and ater produced in a second zone of the each electrical and fluid interconnector of the second group, the first and second zones of the electrical and fluid interconnectors of the second group not being located vertically in line respectively with the first and second zones of the electrical and fluid interconnectors of the first group,
wherein, within the stack, the supplying and a circulation respectively to the electrical and fluid interconnectors and to the electrochemical cells of the first group are carried out independently relative to the supplying and circulation respectively to the electrical and fluid interconnectors and to the electrochemical cells of the second group.

8. The method of claim 7, wherein the first and second zones of the electrical and fluid interconnectors of the first and second groups are arranged such that the distributing the fuel to the anode of the electrochemical cells of the first group is carried out in co-current to the distributing to the electrochemical cells of the second group.

9. The method of claim 7, wherein the first and second zones of the first and second groups of the electrical and fluid interconnectors are arranged such that the distributing the fuel to the anode of the electrochemical cells of the first group is carried out in counter-current to the distributing to the electrochemical cells of the second group.

10. The method of claim 7, the method further comprising:
supplying a third zone of the each electrical and fluid interconnector of the first group with an oxidizer, and distributing it to the cathode of the each, electro chemical cell of the first group, then recovering surplus oxidizer in a fourth zone of the each electrical and fluid interconnector of the first group, and
supplying a third zone of the each electrical and fluid interconnector of the second group with an oxidizer such, and distributing it to the cathode of the each electrochemical cell of the second group, then recovering the surplus oxidizer in a fourth zone of the each electrical and fluid interconnector of the second group, the third and fourth zones of electrical and fluid interconnectors of the second group being located vertically in line respectively with the third and fourth zones of electrical and fluid of the first group interconnectors, so as to have a supply of oxidizer and a recovery of surplus oxidizer which are con on to the first and second groups.

11. The method of claim 7, the method further comprising:
supplying a third zone of the each electrical and fluid interconnector of the first group with an oxidizer, and distributing it to the cathode of the each electrochemical cell of the first group, there recovering surplus oxidizer in a fourth zone of the each electrical and fluid interconnector of the first group, and
supplying a third zone of the each electrical and fluid interconnector of the second group with an oxidizer, and distributing it to the cathode of the each electrochemical cell of the second group, then recovering surplus oxidizer in a fourth zone of the each electrical and fluid interconnector of the second group, the third and fourth zones of electrical and fluid interconnectors of the second group not being located vertically in line respectively with the third and fourth zones of electrical and fluid interconnectors of the first group, so as to have a supply of oxidizer and a recovery of surplus oxidizer which are separate between the first group and the second group.

12. The method of claim 11, wherein the third and fourth zones of electrical and fluid interconnectors of the first and second group are arranged such that the distributing the oxidizer to the cathode of the electrochemical cells of the first group is carried out in counter-current to the distributing the electrochemical cells of the second group.

13. The method of claim 7, wherein the fuel is hydrogen, methane or both hydrogen and methane.

14. The method of claim 1, wherein supplies of gases in the first zone of the electrical and fluid interconnectors of the first group is connected in series to supplies of gases in the first zone of the electrical and fluid interconnectors of the second group.

15. The method of claim 14, wherein the gases are enriched in a fuel and/or in an oxidizer between an outlet of the first group and an inlet of the second group, or vice-versa.

16. The method of claim 14, wherein the electrolysis cells of different sizes between the first and the second groups are used, so that all the electrolysis cells are at the same voltage with different fuel compositions.

17. The method of claim 1, wherein supplies of gases in the first zone of the electrical and fluid interconnector of the first group is in parallel to supplies of gases in the first zone the electrical and fluid interconnector of the second group.

18. The method of claim 17, wherein the first and second group supplied with same compositions and same flow rates of gas.

19. The method of claim 17, wherein the first and the second group are supplied with different compositions of methane or hydrogen so as to have different reforming between the first and the second groups.

20. The method of claim 7, wherein
wherein supplies of gases in the first zone of the electrical and fluid interconnector of the first group is in parallel to supplies of gases in the first zone of the electrical and fluid interconnector of the second group, and
the first and the second group are supplied with a same $H_2O/CO_2/CO$ ratio.

21. The method claim 14, wherein, in operation, the supplies in series are changed into supplies in parallel, and
wherein flow rates and compositions are simultaneously made different between the first and the second groups so as to manage a premature degradation of the electrolysis cells of one of the first and the second groups.

* * * * *